(12) United States Patent
Fotheringham et al.

(10) Patent No.: US 7,000,430 B1
(45) Date of Patent: *Feb. 21, 2006

(54) METHOD OF FORMING GLASS-CERAMIC PARTS AND/OR GLASS PARTS

(75) Inventors: Ulrich Fotheringham, Wiesbaden (DE); Hauke Esemann, Wörrstadt (DE); Bernd Hoppe, Ingelheim (DE); Hubertus Bader, Mainz (DE); Gerhard Hahn, Allenfeld (DE); Markus Garsche-Andres, Stadecken-Elsheim (DE); Matthias Brinkmann, Klein-Winternheim (DE); Norbert Greulich-Hickmann, Mainz (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/937,074

(22) PCT Filed: Mar. 22, 2000

(86) PCT No.: PCT/EP00/02505

§ 371 (c)(1),
(2), (4) Date: Nov. 26, 2001

(87) PCT Pub. No.: WO00/56674

PCT Pub. Date: Sep. 28, 2000

(30) Foreign Application Priority Data

| Mar. 23, 1999 | (DE) | ............................ 299 05 385 U |
| Aug. 19, 1999 | (DE) | ............................... 199 38 807 |
| Aug. 19, 1999 | (DE) | ............................... 199 38 811 |

(51) Int. Cl.
*C03B 32/00* (2006.01)
*B29C 35/08* (2006.01)

(52) U.S. Cl. ........................... 65/33.2; 65/111; 65/273; 65/274; 264/405

(58) Field of Classification Search ................. 65/117, 65/118, 119, 120, 269, 274, 273, 271, 258; 264/1.27, 402, 403, 404, 405; 219/411, 553; 34/266, 519, 201; 250/493.1, 495.1, 496.1
See application file for complete search history.

(56) References Cited

U.S. PATENT DOCUMENTS

| 1,630,724 A |   | 5/1927  | Tillyer |
| 1,953,023 A |   | 3/1934  | Mulholland .................... 49/54 |
| 2,125,912 A |   | 8/1938  | George et al. ................ 219/36 |
| 2,131,873 A |   | 10/1938 | Goodwillie ..................... 49/7 |
| 2,825,183 A |   | 3/1958  | Riedel ........................... 49/17 |
| 2,973,190 A |   | 2/1961  | Schuller ....................... 263/2 |
| 3,045,994 A |   | 7/1962  | Longenecker ............... 263/46 |
| 3,120,433 A |   | 2/1964  | Van Zee ....................... 65/43 |
| 3,193,367 A |   | 7/1965  | Giffen ........................... 65/70 |
| 3,620,706 A |   | 11/1971 | Spanoudis .................... 65/114 |
| 3,880,632 A | * | 4/1975  | Podvigalkina ................. 65/37 |
| 4,213,753 A |   | 7/1980  | Negroni et al. .............. 432/247 |
| 4,547,650 A |   | 10/1985 | Arditty et al. ........ 219/121 LE |
| 4,789,771 A |   | 12/1988 | Robinson et al. ........... 219/405 |

(Continued)

FOREIGN PATENT DOCUMENTS

DE 740 892 12/1943

(Continued)

*Primary Examiner*—Steven P. Griffin
*Assistant Examiner*—Carlos Lopez
(74) *Attorney, Agent, or Firm*—Baker & Daniels (57) ABSTRACT

The invention relates to a method of producing glass-ceramic parts and/or glass parts by deformation of a glass-ceramic blank and/or glass blank. The invention is characterized in that forming is carried out using infrared radiation.

18 Claims, 6 Drawing Sheets

U.S. PATENT DOCUMENTS

| | | | |
|---|---|---|---|
| 4,889,547 A | 12/1989 | Lecourt et al. | 65/107 |
| 4,983,202 A | 1/1991 | Deb et al. | 65/104 |
| 5,931,152 A | 8/1999 | Fafet et al. | 126/214 R |
| 6,710,306 B1 * | 3/2004 | Hahn et al. | 219/411 |
| 2003/0182966 A1 * | 10/2003 | Fotheringham et al. | 65/33.2 |

FOREIGN PATENT DOCUMENTS

| | | | |
|---|---|---|---|
| DE | 807 132 | | 6/1951 |
| DE | 1 024 684 | | 8/1953 |
| DE | 24 32 538 | | 1/1976 |
| EP | 0 058 529 | | 8/1982 |
| EP | 0 112 224 | | 6/1984 |
| EP | 0 133 847 | | 3/1985 |
| EP | 0133847 | * | 6/1985 |
| EP | 0317409 | | 5/1989 |
| EP | 0 376 509 | | 7/1990 |
| FR | 802 598 | | 9/1936 |
| FR | 2 267 987 | | 11/1975 |
| FR | 2 386 492 | | 11/1978 |
| FR | 2 505 472 | | 11/1982 |
| FR | 2 606 866 | | 5/1988 |
| GB | 651989 | * | 4/1951 |
| GB | 729 072 | | 5/1955 |
| GB | 2 320 021 | | 6/1998 |
| JP | 07-18323 | * | 1/1995 |
| RU | 560 841 | | 6/1977 |
| RU | 660 949 | | 5/1979 |
| WO | WO 98/57899 | | 12/1998 |

* cited by examiner

METHOD OF FORMING GLASS-CERAMIC PARTS AND/OR GLASS PARTS

BACKGROUND OF THE INVENTION

The invention relates to a method for producing glass-ceramic parts and/or glass parts by means of deformation of a glass-ceramic blank and/or glass blank and to a device for carrying out said method.

Known methods of forming glass-ceramics, especially three-dimensional forming based on the state of the arts starts with a vitreous fabricated material because once the glass has been ceramized the only way of deforming it again is generally via the detour of melting.

In order to deform the basic glass of glass-ceramics with the forming methods usually used for glass, for example gravity lowering or vacuum lowering, it is typically heated to temperatures around 1000° C. where crystal growth will take place if nuclei were previously formed. When the basic glass is heated to the target temperature of 1000° C., for example, where crystal growth can occur, the nucleation range between 700° C. and 800° C., where minute crystallization nuclei are separated, inevitably has to be passed.

In order to prevent nucleation that may be inhomogeneous in the critical nucleation range and to prevent adverse affects to the properties of the glass-ceramic produced by the subsequent ceramizing process or prenucleation which will cause crystallization in the subsequent forming process, thereby making the process impossible, the nucleation range has to be passed as quickly as possible.

Forming glass originates with a glass blank and the usual deformation methods used for glass, such as gravity lowering or vacuum lowering, where the glass blank is typically heated to temperatures above the softening point of 1000° C., for example.

Heating the glass-ceramic blank or the glass blank quickly can be achieved, for example, by using high-capacity surface heaters.

Generally, the term surface heaters refers to heaters where at least 50% of the total heat flow from the heat source is supplied to the surface or the near-surface layers of the object to be heated.

A special type of surface heating a heating method using a gas flame where the flame temperatures are typically around 1000° C. Heating by means of a gas burner mostly takes place in that the heat energy of the hot gas is transferred across the surface of the glass-ceramic blank or glass blank. This may result in a temperature gradient that can adversely affect the forming because of viscosity gradients, for example. This particularly applies to glass thicknesses of $\geqq 5$ mm.

In order to through-heat the glass or glass-ceramic blank quickly by means of heat conduction the gas burner requires a high capacity output. Such heating is limited to small areas because gas burners are not capable of providing the required full-surface power density.

Therefore, heating with gas burners is especially not suitable for producing complex three dimensional glass-ceramics and is limited to simple geometries.

Other disadvantages of heating with gas burners are the following, for example:

relatively uncontrolled flame operation, and
intrusion of interfering gasses, which can adversely affect the quality of the material.

Another option for producing three-dimensionally deformed glass-ceramics is placing them on the appropriate mold during the ceramizing process. However, the required low viscosities will not be obtained in this case, and as a result complex geometries can be formed only with very high bending radii.

PCT/FR96/00927 discloses reprocessing preliminary stages of glass-ceramics where the rolled ribbon of glass coming from high temperatures is formed directly at the melting tank when the required temperature is obtained, even before the critical nucleation range of glass-ceramics is reached.

The disadvantage of the method disclosed in PCT/FR96/00927 is the exceptionally high effort because the continuous process of forming glass has to be altered directly. Also, a subsequent forming process, separate from the tank operation, of intermediately stored glass-ceramic blanks for example, by means of reheating after they have cooled is not possible.

Another option for producing three-dimensionally formed glass is forming it in that it is positioned on the appropriate mold already during or after the melting process instead of using a glass blank.

In this case, the glass can be formed directly at the melting tank from a rolled ribbon of glass, for example.

The disadvantage of such a method is that the glass forming process is coupled to the tank operation.

SUMMARY OF THE INVENTION

It is the object of the invention to provide a method and a device for producing glass-ceramic parts and/or glass parts by means of deformation of a glass-ceramic blank and/or glass blank which overcome the above described disadvantages. The present method provides the following features:

a procedure which is independent of the tank operation, for example a secondary procedure,
complex three dimensional deformations even with very small bending radii,
largely preventing undesired preceramization,
largely preventing undesired temperature gradients.

The problem is solved by means of the invention in that the forming process of the present method is carried out using infrared radiation, preferably short-wave infrared radiation of <2.7 $\mu$m wavelength or NIR radiation.

According to a first embodiment of the invention the forming will take place while a glass blank is being softened. According to a further embodiment of the invention the forming process takes place in that a glass-ceramic blank is reprocessed before it is ceramized. This offers the advantage that the glass can be deformed offline at any time.

An alternative would be forming the glass-ceramic blank together with its ceramization.

It is especially advantageous if the deformed glass-ceramic blank and/or glass blank is a glass plate.

All standard forming methods used for processing glass are conceivable as a forming method, for example forming by means of gravity lowering which may be supported by vacuum. In this case, it is called vacuum lowering. Alternatively, it can be lowered into the mold by means of a molding plug or by means of blowing in air.

In addition to the forming process by means of lowering into a mold, a directional infrared radiation of the glass or glass-ceramic blank to be formed can take place alternatively or in combination with the lowering process, which allows heating and thus forming specific zones.

In support of or as an alternative to directional infrared radiation certain areas of the blank can specifically be heated or remain cold by providing appropriately configured shields.

It is especially advantageous to carry out the complete forming process in an infrared radiation hollow and to apply the heat by means of infrared radiators as radiation sources.

According to an embodiment of the invention the glass-ceramic blank and/or glass blank is heated in part directly by means of infrared radiation from the infrared radiators and in part indirectly by the infrared radiation which is reflected or back scattered by the walls, the ceiling and/or the floor of the infrared radiation hollow.

It is especially advantageous if the portion of the indirect radiation, i.e. the back scattered or reflected radiation acting on the glass or glass-ceramic blank to be heated, is more than 50%, preferably more than 60%, preferably more than 70%, especially preferably more than 80%, especially preferably more than 90%, in particular more than 98% of the total radiation output.

Preheating can be used so as to homogenize the temperature, for example in a conventional oven. In another embodiment, a formed glass or a formed glass-ceramic is also reheated.

In addition to the method, the invention also provides a device for carrying out the method which includes an infrared radiation hollow having walls, a ceiling and/or a floor reflecting the infrared radiation, where a plurality of infrared radiators are disposed in the infrared radiation hollow.

Infrared radiation hollows are described, for example, in U.S. Pat. No. 4,789,771 and EP 0 133 847, whose disclosure content has been fully incorporated in this application. Preferably, the portion of the infrared radiation which is reflected and/or scattered by the wall surfaces, the floor and/or the ceiling is more than 50% of the radiation impinging on the surfaces.

It is particularly advantageous if the portion of the infrared radiation reflected and/or scattered by the wall surfaces, the floor and/or the ceiling is more than 90%, especially more than 98%.

A particular advantage of using an infrared radiation hollow is that when highly reflecting and/or back scattering wall, floor and/or ceiling materials are used, the infrared radiation hollow is a high quality resonator subject only to minor losses and thus it ensures a high energy utilization.

Using wall, ceiling and/or floor materials that back scatter diffusely achieves an especially uniform irradiation of all volume elements of the hollow at all angles. This prevents potential shading effects in the case of complex formed glass-ceramic parts and/or glass parts.

Ground Quarzal plates can be used, for example, for back scattering, i.e. reflecting wall material, having a thickness of 30 mm, for example.

Other materials that back scatter the infrared radiation can also be used for wall, ceiling and/or floor materials or coatings for the infrared radiation hollow, for example one or more of the following materials:

$Al_2O_3$; $BaF_2$; $BaTiO_3$; $CaF_2$; $CaTiO_3$;
$MgO$ 3,5 $Al_2O_3$; $MgO$, $SrF_2$; $SiO_2$;
$SrTiO_3$; $TiO_2$, Spinell, cordierite
cordierite sintered glass ceramic In a preferred embodiment of the invention the infrared radiators have a color temperature of more than 1500 K, especially preferably more than 2000 K, most preferably more than 2400 K, in particular more than 2700 K, particularly preferably more than 3000 K.

In order to prevent the infrared radiators from overheating they are preferably cooled, especially air-cooled or water-cooled.

In order to specifically heat the glass or the glass-ceramic, for example by means of directional radiators, the infrared radiators can be turned off individually, in particular, their electrical output can be controlled.

BRIEF DESCRIPTION OF THE DRAWINGS

The invention is described below by means of the figures and the exemplary embodiments, as follows.

Figure 1:
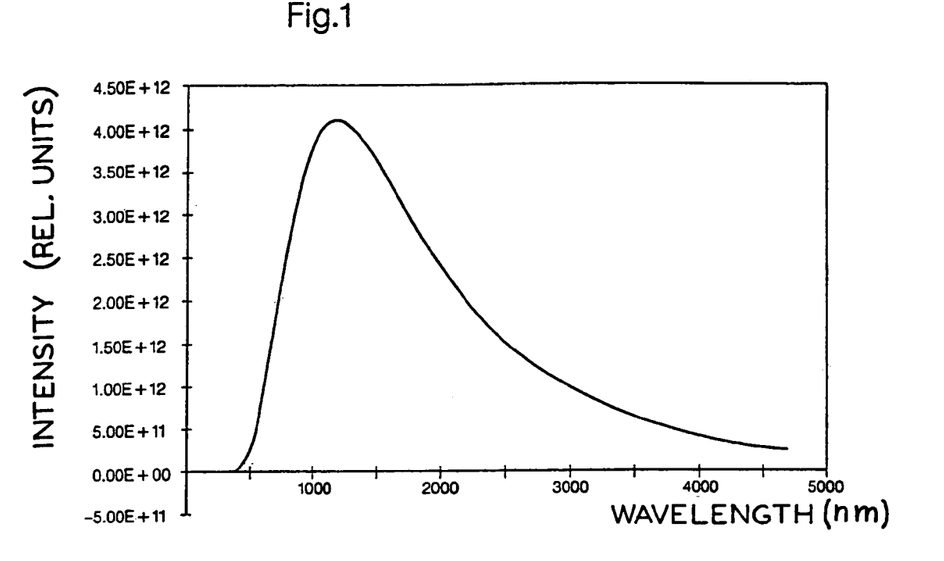
FIG. 1 shows the Planckian locus of a potential infrared radiator having a temperature of 2400 K.

FIG. 1 illustrates the intensity distribution of an infrared radiation source such as can be used for heating a glass or glass-ceramic blank for complex forming in accordance with the invention. The infrared radiators used can be linear halogen infrared quartz tube radiators with a nominal capacity of 2000 W at a voltage of 230 V, preferably having a color temperature of 2400 K. According to the Wien displacement law the radiation maximum of said infrared radiators is at a wavelength of 1210 nm.

According to the forming method of the invention the heating device and the products to be baked or the glass or glass-ceramic blank to be formed are located in an infrared radiation hollow equipped with infrared radiators. This requires the quartz glass radiators to be adequately temperature-resistant or appropriately cooled. The quartz glass tube can be used up to approx. 1100 C. It is preferable to configure the quartz glass tubes considerably longer than the heating spiral and to guide them out of the hot area so that the connections are in the cold area so as not to overheat the electrical connections. The quartz glass tubes can be made with or without coating.

Figure 2A:
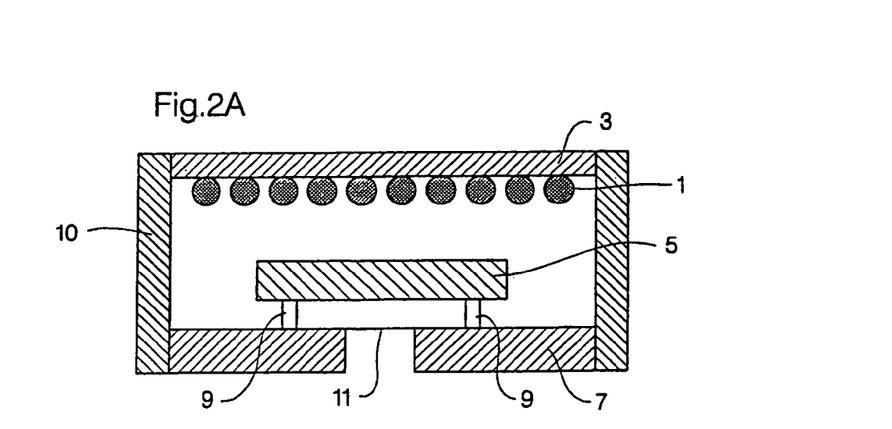
FIG. 2A shows the basic structure of a heating device according to the invention including a radiation hollow.
Figure 2B:
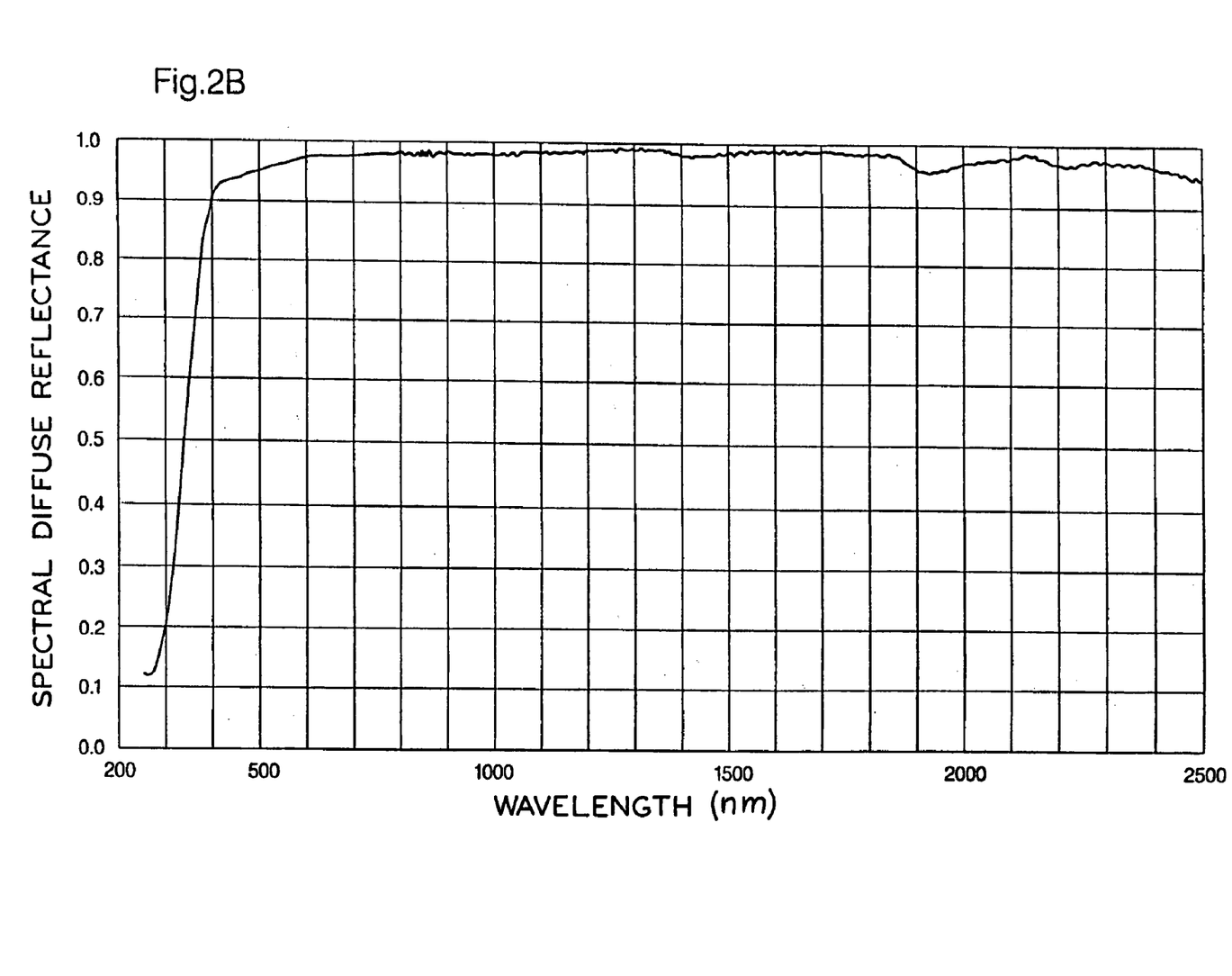
FIG. 2B shows the reflectance curve over the wavelength of Al2O3 Sintox AL made by Morgan Matroc, Troisdorf, with a diffuse reflectance of >95%, and of >98% over a wide spectral region, in the infrared wavelength range.

FIG. 2A shows a first embodiment of a heating device for a forming method of the invention including an infrared radiation hollow.

The heating device shown in FIG. 2A comprises a multiplicity of infrared radiators 1, which are disposed below a reflector 3 of highly reflecting or highly back scattering material. With the reflector 3 the output supplied by the infrared radiator into other directions can be guided to the glass or glass-ceramic blank. The infrared radiation supplied by the infrared radiators partially penetrates the glass-ceramic blank 5 or glass blank 5, which is semi-transparent in this wavelength range, and meets a carrier plate 7 of highly reflecting or highly scattering material. Quarzal is especially suitable for this. It reflects approx. 90% of the impinging radiation in the infrared range. Alternatively, $Al_2O_3$ could be used which has a degree of reflection of approx. 98%. The glass-ceramic blank 5 or glass blank 5 is positioned on the carrier plate 7 by means of Quarzal or $Al_2O_3$ strips 9, for example. The temperature on the underside can be measured by means of a pyrometer through a hole 11 in the carrier plate.

With an appropriate configuration using a reflecting or diffusely back scattering material or Quarzal or $Al_2O_3$, the walls 10, in combination with the reflector 3 as a ceiling and the carrier plate 7 as a floor, can form an infrared radiation hollow of high quality.

Figure 3A:
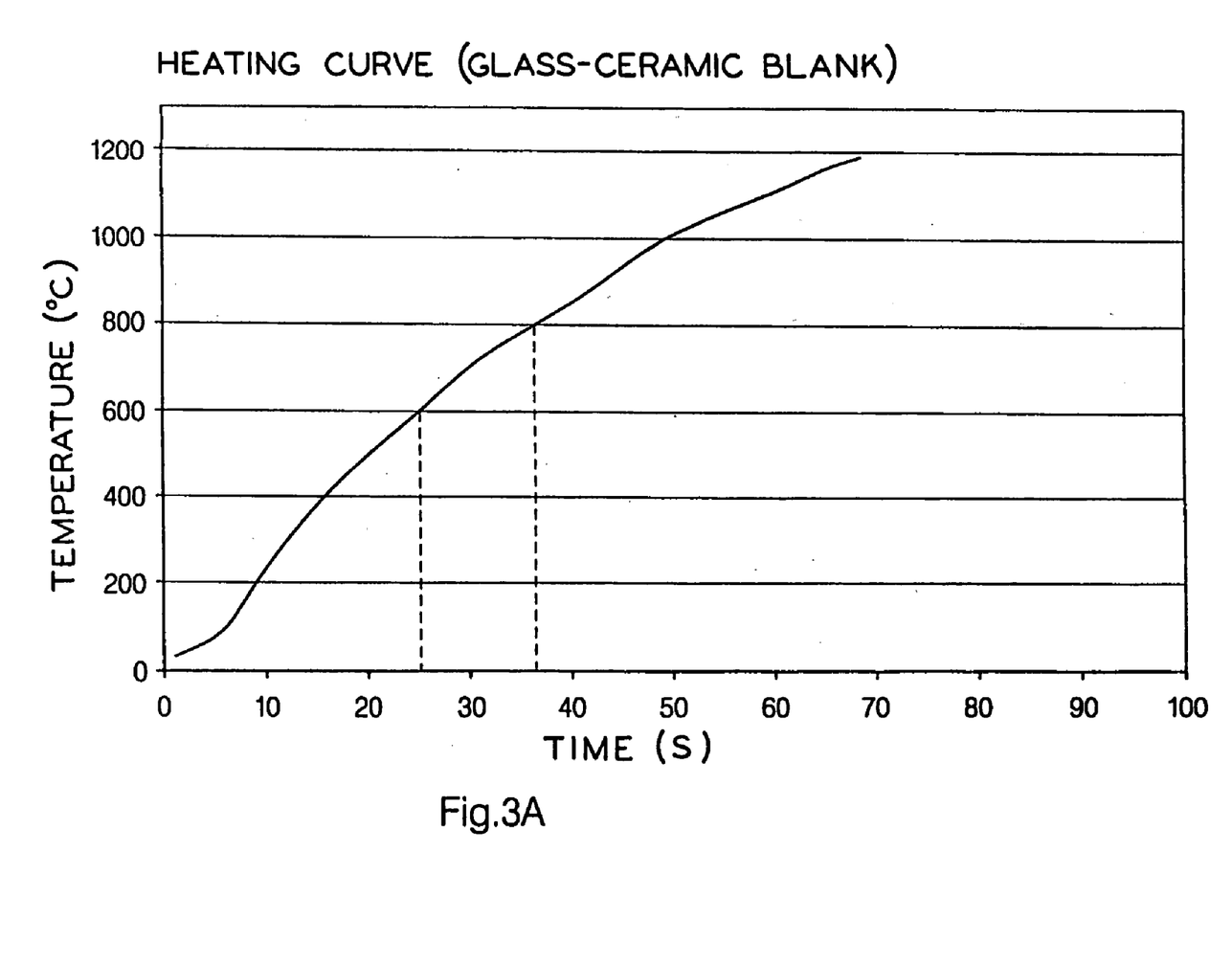
FIG. 3A shows the heating curve of a glass-ceramic blank to be formed in a heating device comprising an infrared radiation hollow.

FIG. 3A shows the heating curve of a glass-ceramic blank to be formed according to a method of the invention where the glass-ceramic blank to be formed measures approx. 200 mm and has a thickness of 4 mm.

Figure 3B:
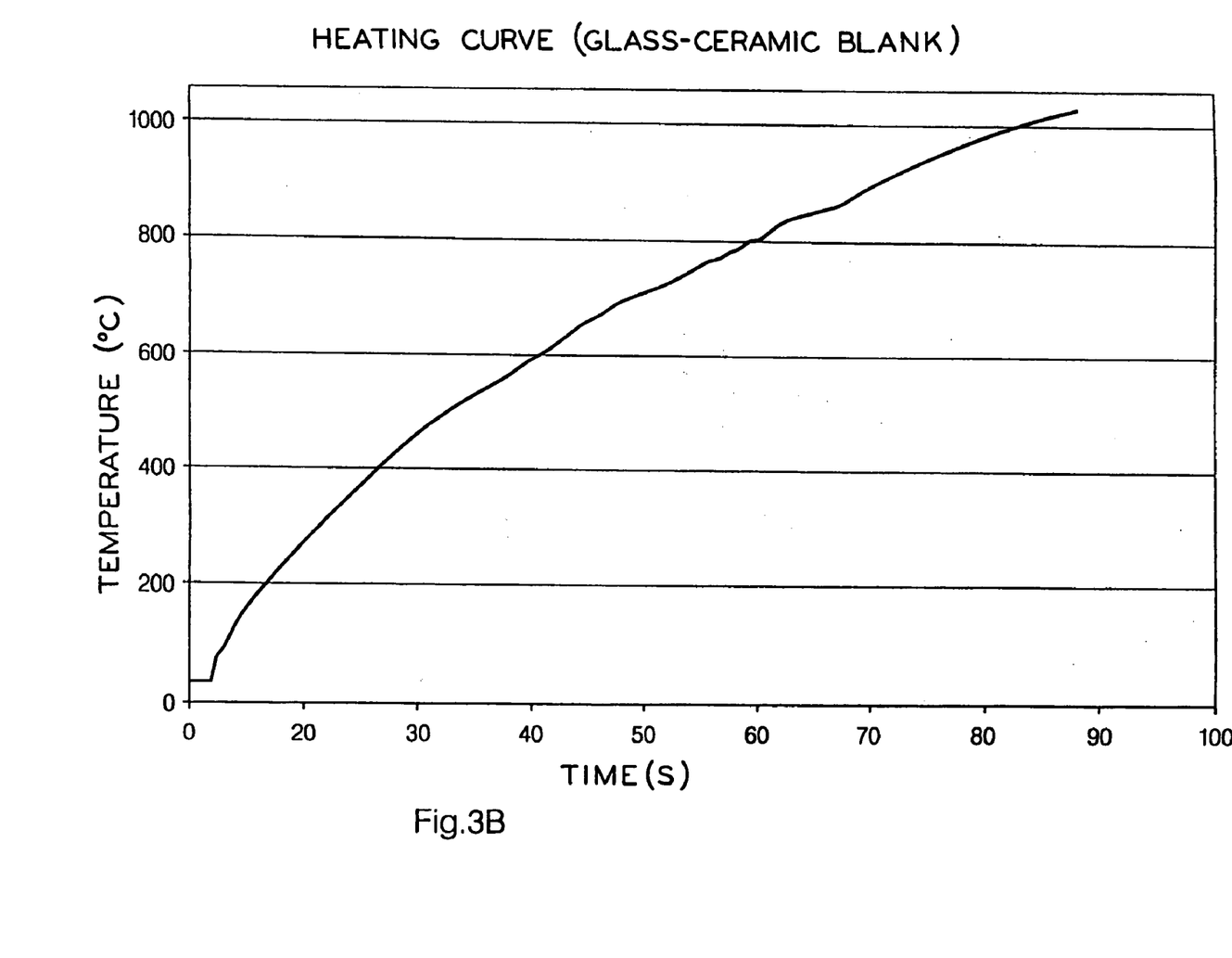
FIG. 3B shows the heating curve of a glass blank to be formed in a heating device comprising an infrared radiation hollow.

FIG. 3B shows the heating curve of a glass blank to be formed according to a method of the invention where the glass sample to be formed measures approx. 200 mm and has a thickness of 4 mm.

The heating method or the heat treatment, respectively, is described below:

The glass-ceramic blanks to be formed and subsequently ceramized, if required, or the glass blanks to be formed were initially heated in an infrared radiation hollow walled in with Quarzal as per FIG. 2A whose ceiling was formed by an aluminum reflector with infrared radiators disposed underneath. The samples were suitably positioned on Quarzal.

In the infrared radiation hollow the glass or glass-ceramic blanks were directly irradiated by multiple halogen infrared radiators which were disposed at a distance of between 10 mm and 150 mm above the glass or glass-ceramic blanks to be formed.

The respective glass-ceramic blank or glass blank was then heated up by means of controlling the infrared radiator via a thyristor regulator based on absorption, reflection and scattering processes, as described below in detail:

Because the absorption length of the applied short-wave infrared radiation in the glass is very much larger than the dimensions of the objects to be heated most of the impinging radiation is able to pass through the sample. On the other hand, because the absorbed energy per volume is virtually identical at all points of the glass homogeneous heat is achieved over the entire volume. In the test as per FIGS. 3A and 3B for the glass-ceramic or glass sample to be formed the infrared radiators and the glass or glass-ceramic blank to be heated are located in a radiation hollow whose walls, floor and/or ceiling consist of a material whose surface is highly reflective, where at least a portion of the wall, floor and/or ceiling surface back scatters the radiation predominantly diffusely. This causes the predominant portion of the radiation, which is initially able to pass through the glass or glass-ceramic blank, to reenter the object to be heated after reflecting or scattering on the wall, floor and/or ceiling, and it is partially absorbed again. The path of the radiation which is also able to pass through the glass or glass-ceramic blank in the second passage continues analogous. This method achieves a deep homogeneous, heating of the glass or glass-ceramic blank, and the utilization of the applied energy is considerably better than with a single passage through the glass or glass-ceramic blank.

Figure 4A:
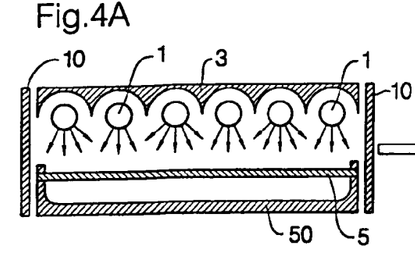
FIGS. 4A and 4B show deformation of a glass-ceramic blank and/or glass blank by gravity lowering.
Figure 4B:
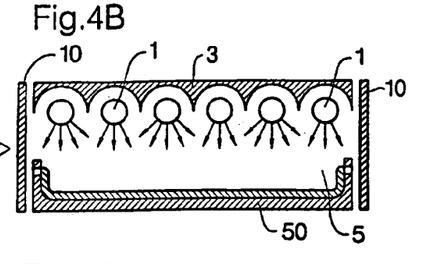

FIGS. 4A and 4B illustrate the structure of the forming process for a glass or glass-ceramic blank 5 in an infrared radiation hollow with infrared heating radiators 1 by means of gravity lowering.

The infrared radiators 1 are disposed in the radiation hollow above the glass-ceramic blank 5 or glass blank 5 to be formed. The reflectors 3 are positioned above the infrared radiators 1.

The infrared radiators 1 heat the glass-ceramic blank 5 or glass blank 5 from the top. The mold 50 into which the blank 5 is lowered is coated with infrared reflecting material as are the walls 10 of the infrared radiation hollow. More than 50%, preferably 90 or 95%, especially preferably 98% of the infrared radiation meeting the walls 10 or the mold 50 are reflected. During the subsequent passage the reflected radiation again heats up the glass-ceramic blank or glass blank.

If a certain temperature in the glass-ceramic blank or glass blank is exceeded the heated glass-ceramic blank or glass blank will be lowered into the mold 50 because of its gravity as illustrated in FIG. 4B.

For glass-ceramic blanks the forming process can be carried out both before ceramization or together with the ceramizing process.

After the forming process has been completed the formed glass or glass-ceramic part is removed from the mold after the heat from the infrared radiators has been turned off.

Reheating the part in an oven may also be carried out subsequent to the forming process.

Figure 5A:
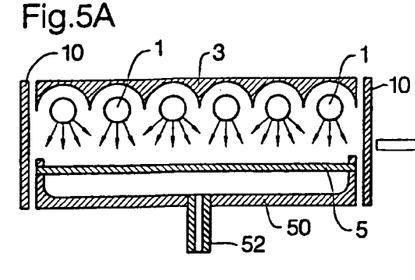
FIGS. 5A and 5B show deformation of a glass-ceramic blank and/or glass blank by vacuum lowering.
Figure 5B:
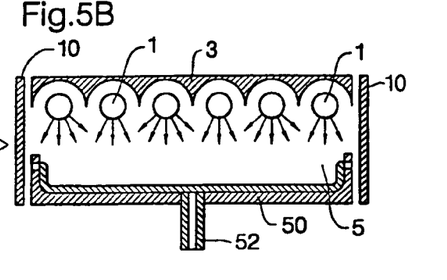

The forming process can be supported by providing a vacuum as illustrated in FIGS. 5A and 5B.

For this purpose, a vacuum connection 52 will be provided in the mold below the glass-ceramic blank 5 or the glass blank 5 to be formed.

The gravity lowering process after heating up by means of the infrared radiators is supported by supplying a vacuum.

Figure 6A:
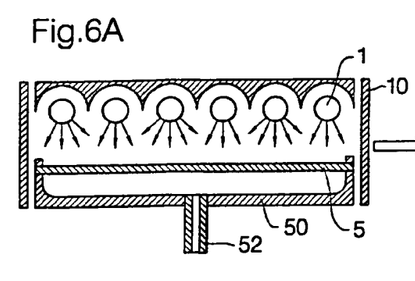
FIGS. 6A and 6B show deformation of a glass-ceramic blank and/or glass blank by lowering, supported by a compression molding tool.
Figure 6B:
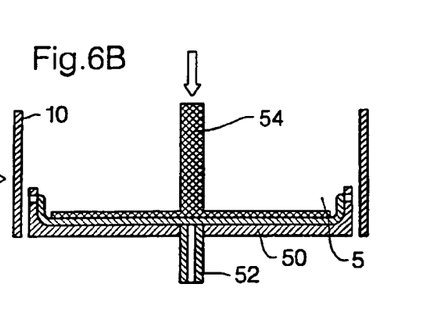

Alternatively, as shown in FIGS. 6A and 6B, the deformation process can be supported by means of a molding plug 54. In this case, after the plate is heated the infrared radiators, which are positioned above the plate to be heated, are preferably shifted and subsequently the heated plate 5 is lowered into the mold by means of the molding tool or the molding plug 52.

As an alternative to shifting the infrared radiators the mold with the heated plate could also be shifted.

Figure 7A:
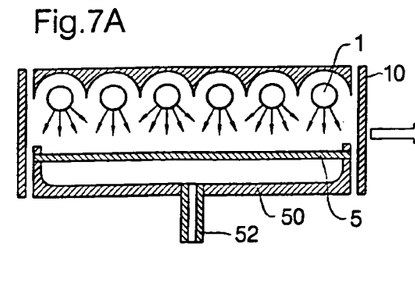
FIGS. 7A and 7B show deformation of a glass-ceramic blank and/or glass blank by lowering, supported by overpressure.
Figure 7B:
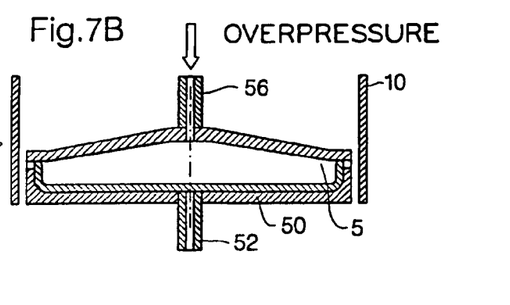

Instead of lowering by means of a molding plug 54 it is possible to place the heated plate into the mold by blowing in an overpressure by means of a blow tool 56, as shown in FIGS. 7A and 7B.

Figure 8:
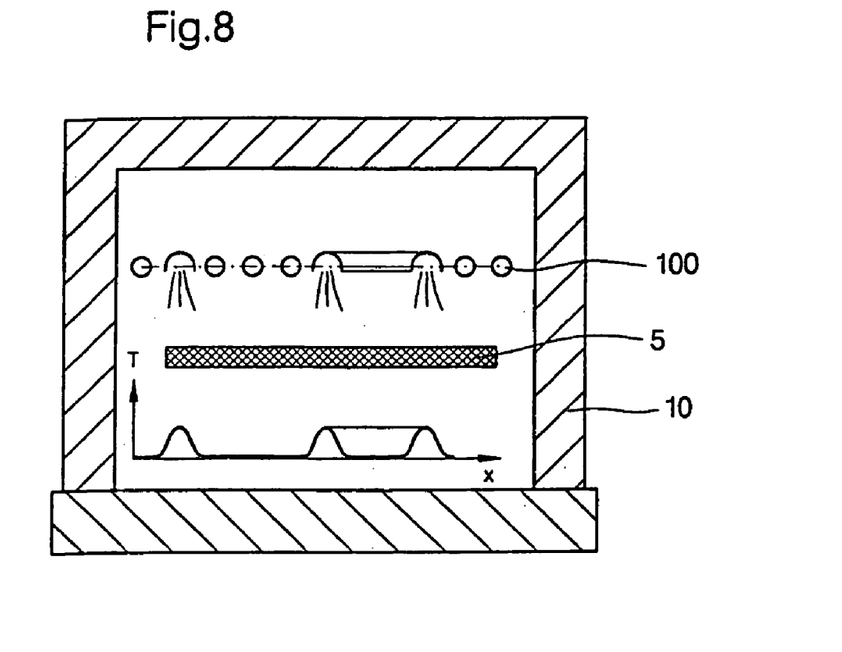
FIG. 8 shows deformation of a glass-ceramic blank and/or glass blank by means of directional infrared radiators.

FIG. 8 shows the selective heating of a glass-ceramic blank or glass blank by means of directional infrared radiators 100.

With such directional heating the deformation processes can be employed in certain specific areas of the glass-ceramic blank or glass blank to be formed. By individually controlling the directional infrared radiators 100 it is possible to produce temperature profiles distributed over an area in the glass-ceramic blank or glass blank to be formed so as to provide the glass-ceramic or the glass with any desired, predetermined form.

Figure 9:
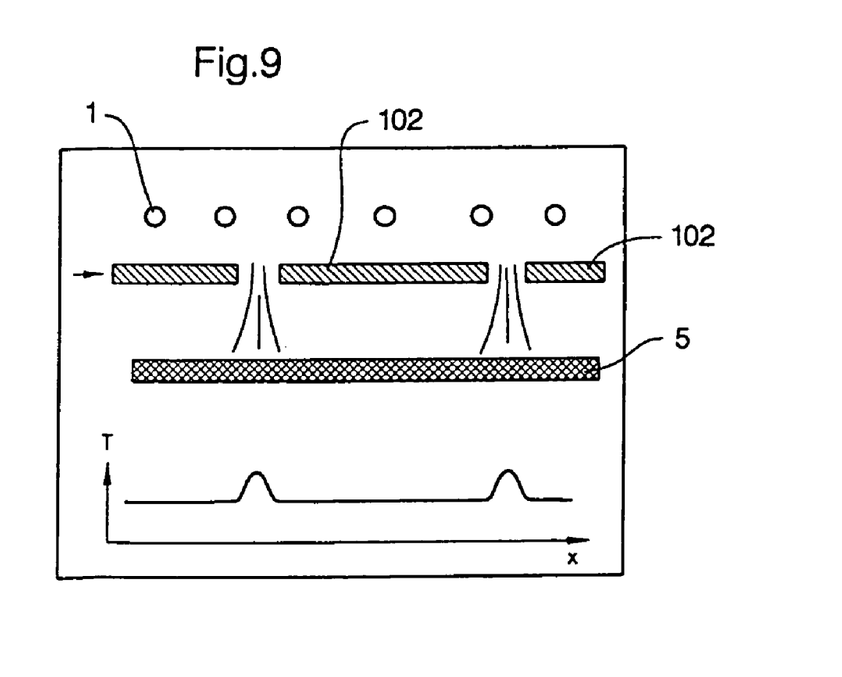
FIG. 9 shows deformation of a glass-ceramic blank and/or glass blank in an infrared radiation hollow including a shield.

Shields 102 can be provided instead of directional and individually controlled infrared radiators which shields are placed between the infrared radiators 1 and the top side of the plate 5 to be heated.

Such an embodiment of the invention is shown in FIG. 9.

Using the method of the invention the material reaches temperatures in the range between 1150° C. and 1200° C. and above, and it is also possible to provide that the temperature inhomogeneity in the work piece will not exceed +/−10 K before the forming process.

When the formed glass-ceramic part or glass part is removed the temperature of the formed glass-ceramic or the formed glass is preferably less than 250° C., the cooling rate of the class-ceramic or the glass when the radiator is turned off is preferably above 150° C. per minute.

Heating up a glass-ceramic or glass blank by means of the infrared radiation method preferably takes less than 60 seconds, and cooling preferably takes less than 180 seconds. The cooling can take place both outside or inside the unit, achieving cycles of 60 seconds for cooling outside the unit and of less than 5 min. when cooled inside the unit.

Fluted components, for example, can be produced by means of the method of the invention, having a circular arc cross-section of less than 150 mm, the component having a width of less than 200 mm and fluted components of glass-ceramic or glass can be formed, for example, having a rectangular or trapezoid cross-section.

Complex three-dimensional type deformations are also feasible.

We claim:

1. A method for producing glass-ceramic parts and/or glass parts comprising: forming a glass-ceramic and/or glass blank using infrared radiation, wherein the infrared radiation is a short-wave infrared radiation from an infrared radiation source with a color temperature of more than 1500 K, and a portion of the infrared radiation acts directly on the glass-ceramic blank and/or glass blank, and another portion of the radiation acts indirectly on the glass-ceramic blank and/or glass blank, and wherein the portion of the radiation acting indirectly on the glass-ceramic blank and/or glass blank is more than 50% of the total radiation impinging on the surfaces of the glass-ceramic blank and/or glass blank.

2. The method of claim 1, wherein a glass-ceramic blank is produced, and said forming step is carried out before the glass-ceramic blank is ceramized.

3. The method of claim 1, wherein a glass-ceramic blank is produced, and said forming step is carried out together with ceramization of the glass-ceramic blank.

4. The method of claim 1, wherein the glass-ceramic blank and/or the glass blank is a glass plate.

5. The method of claim 1, wherein a glass blank is produced, and said forming step is carried out while the glass blank is being softened.

6. The method of claim 1, wherein said forming step further comprises gravity lowering said glass-ceramic blank and/or glass blank.

7. The method of claim 1, wherein said forming step further comprises vacuum lowering said glass-ceramic blank and/or glass blank.

8. The method of claim 1, wherein said forming step further comprises lowering said glass-ceramic blank and/or glass blank by means of a molding plug.

9. The method of claim 1, wherein said forming step further comprises lowering said glass-ceramic blank and/or glass blank by blowing.

10. The method of claim 1, wherein said forming step further comprises a directional infrared irradiation of the glass-ceramic blank and/or glass blank using a plurality of directional infrared radiators.

11. The method of claim 1, wherein said forming step further comprises the use of shields disposed between the radiation source and the glass-ceramic and/or glass blank.

12. The method of claim 1, wherein said forming step is carried out in an infrared radiation chamber.

13. The method of claim 12, wherein said radiation is carried out by means of infrared radiators disposed in the infrared radiation chamber.

14. The method of claim 1, further comprising the additional step of preheating the glass-ceramic blank and/or glass blank.

15. The method of claim 14, wherein the glass-ceramic blank and/or glass blank is preheated in a conventional oven.

16. The method of claim 1, further comprising the additional step of reheating the glass-ceramic and/or the glass blank after said forming step.

17. The method of claim 16, wherein the glass-ceramic and/or the glass blank is reheated in a conventional oven.

18. The method of claim 1, wherein the color temperature of the radiation source is more than 2000 K.

* * * * *